Patented Sept. 3, 1929.

1,727,268

UNITED STATES PATENT OFFICE.

MARCEL BADER AND CHARLES SUNDER, OF MULHOUSE, FRANCE, AND THÉODORE VOLTZ, OF BASEL, SWITZERLAND, ASSIGNORS TO THE FIRM DURAND & HUGUENIN S. A., OF BASEL, SWITZERLAND.

PREPARATION OF ESTERLIKE DERIVATIVES OF VAT DYESTUFFS.

No Drawing. Application filed July 27, 1923, Serial No. 654,273, and in Germany August 21, 1922.

The U. S. Patent No. 1,448,251 discloses a process for the manufacture of water-soluble ester-like derivatives of vat-dyestuffs, especially valuable for dyeing and printing purposes, consisting in treating the leuco-compounds of vat-dyestuffs with chlorosulfonic acid in presence of a tertiary base, that is a tertiary organic nitrogen-containing base with or without the use of an indifferent diluent.

Now we have found that the chlorosulfonic acid can be replaced by sulfur trioxide $(SO_3)$ as such or in the form of fuming sulfuric acid.

Example 1.

To a strongly cooled mixture of 120 parts of chlorobenzene, 90 parts of dimethylaniline and 26 parts of leuco-indigo there are added, while stirring, with exclusion of air, drop by drop, 36 parts of fuming sulfuric acid of 66 per cent. The mass is agitated for some time in the cold and thereupon brought slowly to 50–60° C. The agitation is continued until the end of the reaction. Afterwards an alkali is added and the dimethylaniline and chlorobenzene are distilled off by introduction of steam. The residual solution is filtered hot. A small quantity of indigo remains on the filter, while the solution is allowed to cool down in order to crystallize out the ester-salt. The latter is soluble in water and especially valuable for dyeing and printing; by means of a suitable oxidizing agent with acid the original dyestuff is reformed.

Example 2.

Into a strongly cooled mixture of 120 parts of chlorobenzene and 48 parts of dimethylaniline there are introduced, while stirring, 24 parts of sulfur trioxide. During the operation the air is removed in the reaction vessel by carbon dioxide. To the resulting mixture there are then added 26 parts of leuco-indigo. The mass is agitated for some time in the cold and then, while continuously stirring, heated slowly to 50–60° C. The further treatment takes place as in the foregoing example.

The body obtained probably corresponds to the formula:

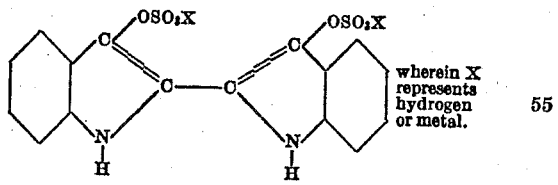

wherein X represents hydrogen or metal.

If X stands for sodium, there is a sodium salt which is easily soluble in water.

The herein described modification of the process can be applied in the same sense and to the same extent as in the U. S. patent above referred to.

What we claim is:

1. A process for the manufacture of stable esterlike derivatives of vat dyestuffs in solid form soluble in water, consisting in treating a leuco compound of a vat dyestuff with fuming sulfuric acid in presence of a tertiary organic nitrogen-containing base capable of promoting the esterification.

2. A process for the manufacture of stable esterlike derivatives of vat dyestuffs in solid form soluble in water, consisting in treating a leuco compound of a vat dyestuff with sulfur trioxide in presence of a tertiary organic nitrogen-containing base capable of promoting the esterification.

3. A process for the manufacture of stable esterlike derivatives of vat dyestuffs in solid form soluble in water, consisting in treating a leuco compound of a vat dyestuff with fuming sulfuric acid in presence of dimethylaniline.

4. A process for the manufacture of stable esterlike derivatives of vat dyestuffs in solid form soluble in water, consisting in treating a leuco compound of a vat dyestuff with sulfur trioxide in presence of dimethylaniline.

5. A process for the manufacture of stable esterlike derivatives of vat dyestuffs in solid form soluble in water, consisting in treating the leuco compound of indigo with fuming sulfuric acid in presence of a tertiary organic nitrogen-containing base capable of promoting the esterification.

6. A process for the manufacture of stable esterlike derivatives of vat dyestuffs in solid form soluble in water, consisting in treating the leuco compound of indigo with sulfur trioxide in presence of a tertiary organic nitrogen-containing base capable of promoting the esterification.

7. A process for the manufacture of stable esterlike derivatives of vat dyestuffs in solid form soluble in water, consisting in treating the leuco compound of indigo with fuming sulfuric acid in presence of dimethylaniline.

8. A process for the manufacture of stable esterlike derivatives of vat dyestuffs in solid form soluble in water, consisting in treating the leuco compound of indigo with sulfur trioxide in presence of dimethylaniline.

In witness whereof we have hereunto signed our names this 12th day of July, 1923.

MARCEL BADER.
CHARLES SUNDER.
THÉODORE VOLTZ.